Dec. 25, 1962  C. R. TURNER  3,070,684
COOKING TEMPERATURE CONTROL APPARATUS
Filed July 18, 1956  3 Sheets-Sheet 1

INVENTOR:
CHARLES ROGER TURNER
BY
Howson & Howson
ATTYS.

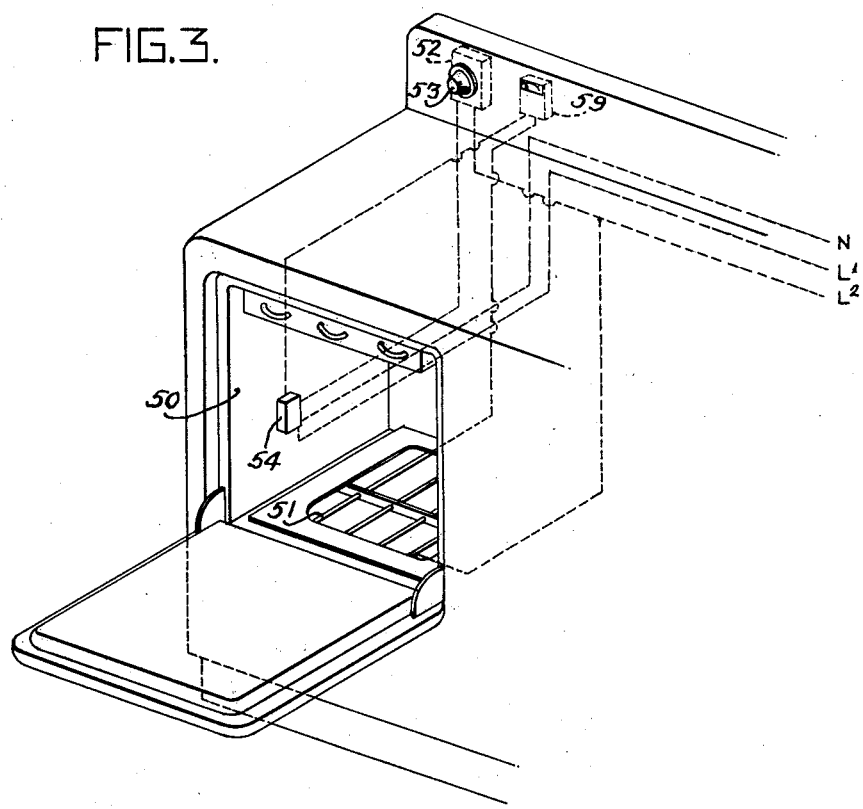
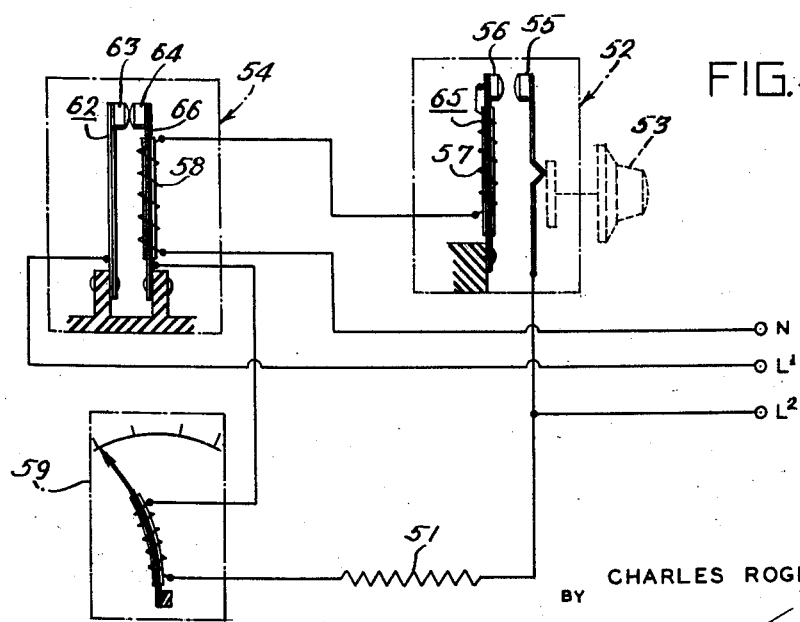

Dec. 25, 1962 C. R. TURNER 3,070,684
COOKING TEMPERATURE CONTROL APPARATUS
Filed July 18, 1956 3 Sheets-Sheet 3

INVENTOR:
CHARLES ROGER TURNER
BY
Howson & Howson
ATTYS

United States Patent Office 3,070,684
Patented Dec. 25, 1962

3,070,684
COOKING TEMPERATURE CONTROL
APPARATUS
Charles Roger Turner, Springfield Township, Montgomery County, Pa., assignor to The Proctor-Silex Corporation, a corporation of Pennsylvania
Filed July 18, 1956, Ser. No. 598,564
13 Claims. (Cl. 219—20)

This invention relates to the control of cooking temperatures. It is concerned primarily with control of the heating units of an electric range, and more particularly with the heating of vessels placed upon the electric surface unit heaters of such a range, to heat such vessels rapidly and to maintain them for a desired length of time at a substantially uniform cooking temperature.

While the conditions which determine the usefulness of an apparatus of this kind are either obvious or easily deducible, commercially available apparatus has fallen short of attainment of these conditions in important particulars. The apparatus should provide a control by which the vessel and its contents may be heated rapidly to the desired cooking temperature, and thereafter maintained at that temperature with only minor fluctuations. Such preliminary heating and control should be obtained and maintained regardless of wide variations in the heat capacity and other characteristics of the mass to be controlled, i.e., they should be the result of automatic operation regardless of the nature of the cooking vessel and regardless of the cooking load as established by the quantity and nature of its contents. It is obviously desirable that the vessel and contents be brought as rapidly as possible to the desired temperature level, but it is equally obvious that such rapid preliminary heating be not attained at the expense of drastic overshooting and/or undershooting in attempting to establish the desired subsequent control.

When we consider that the apparatus should perform in this manner with both extremely light and very heavy cooking loads, and that it is subject to error because of heat which is irrelevant to that desired to be controlled, it becomes apparent that such an apparatus, to be successful, must meet very exacting requirements with great versatility. The basic object of the present invention has been to provide an apparatus by which such a control is established.

A further object of the invention has been to provide an apparatus of this kind which is simple and economical, and yet fully reliable in operation.

Figure 1:
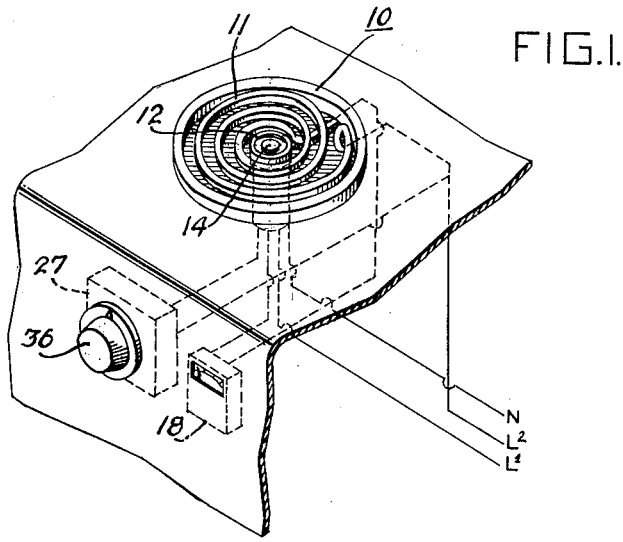
Figure 2:
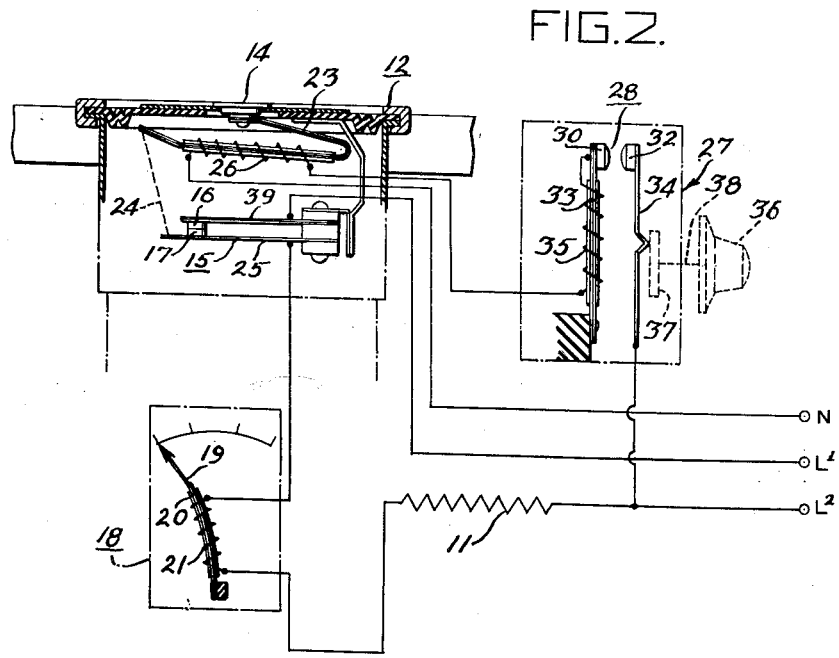
Figure 5:
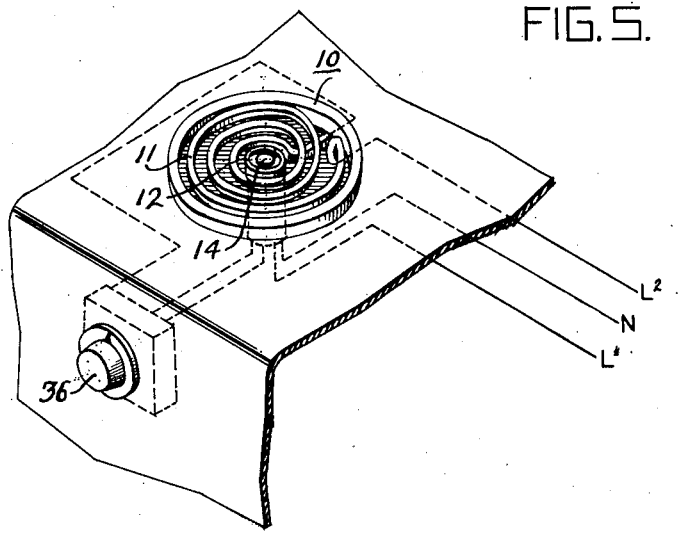
Figure 6:
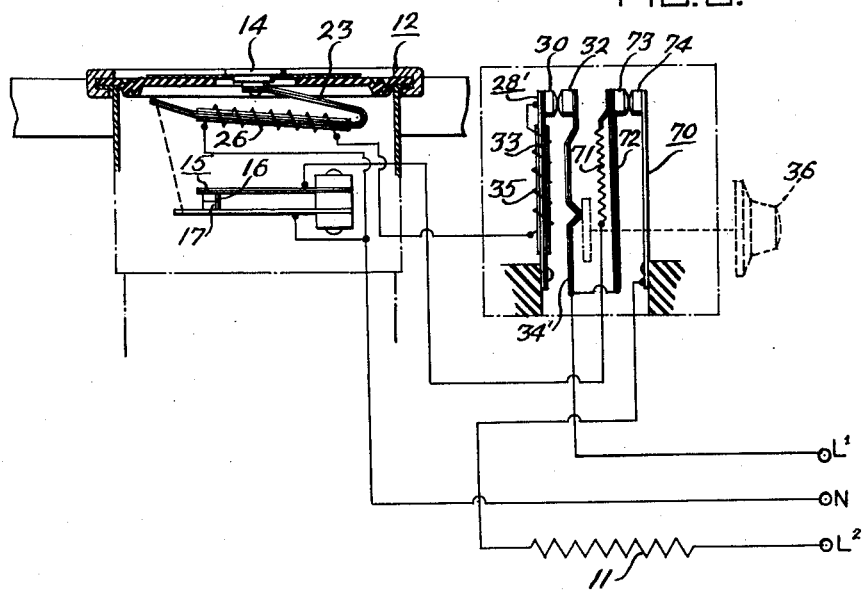

Still further objects and advantages and the manner in which they have been attained will be evident from reading of the following detailed description in the light of the attached drawing, in which, FIGURE 1 is a perspective view of a portion of an electric range, showing a surface unit to which the present invention has been applied in its simplest form, FIGURE 2 is a view, partly in section, partly in elevation and partly diagrammatic, illustrating the circuit connections of the form of FIGURE 1 and their relation to the operating and control units, FIGURES 3 and 4 are views similar to FIGURES 1 and 2 respectively, illustrating application of the invention to control oven temperatures, and FIGURES 5 and 6 are views similar to FIGURES 1 and 2, respectively, illustrating the preferred form of application of the invention to control of surface cooking units, and embodying still further important improvements.

While FIGURES 5 and 6 illustrate the preferred form of the invention, the form of FIGURES 1 and 2 will be described first in the interest of straightforward explanation, since this preliminary explanation will facilitate understanding of the advanced features of FIGURES 5 and 6.

The range to be controlled may include a plurality of electric resistance surface heater units 10 and an oven 50 (FIG. 3). The surface heater units may comprise electric heaters 11 which supply the cooking heat by their resistance and are interconnected in the cooking load circuit through terminals $L^1$ and $L^2$.

The control units of the present invention may be applied to one or more of the surface units as may be desired, and a detector and control unit 12 is applied to each surface unit which is to be so controlled. Each such detector and control unit may be protected from the influence of extraneous heat from unit 11 by the heat shielding and grounding features of my prior Patent 2,699,487, and heat is directly transmitted from the vessel to the detecting apparatus through a central yieldably-mounted, metallic disc 14 upon which the vessel rests. The control unit includes a normally closed switch 15 having contacts 16 and 17 upon its opposed arms. When these contacts are closed, the load current will flow through the electric surface heater 11 from terminal $L^2$ to terminal $L^1$, as illustrated in FIGURE 2 of the drawing, and this current may also be used to operate an electric thermometer 18 which includes an indicating arm 19 mounted upon the end of a bimetal strip 20 which is heated by an electric resistance heater 21 forming a part of the load circuit.

The contact 17 is moved relatively to its associated contact 16 by its joint response to heat derived through the metallic disc 14 from the vessel upon the surface heater unit and separately controlled heat imparted to the detector and control unit through a separate pilot circuit. The metallic disc 14 is secured in heat-conducting relationship to an underlying bimetal member 23, which is preferably in the form of a U-shaped strip, as illustrated, and is designed to flex downwardly at its free end upon the application of heat. The free end of this bimetal arm is secured by a mechanical connection at 24 to the free end of contact-carrying arm 25, so that flexing of this arm occurs under its inherent resilience upon heating the bimetal to a predetermined temperature, and switch 15 is thereby opened to interrupt the load circuit.

The bimetal member 23 is also heated, at an established average rate, by an electric resistance heater in the form of a coil 26 surrounding its lower arm. This heater is a part of a pilot circuit established by actuation of a pilot control unit 27. The pilot control unit includes a second switch 28 having contacts 30 and 32 mounted on arms 33 and 34, respectively, and adapted when closed to establish a circuit from terminal $L^2$ through contacts 32 and 30 and heater coil 26 to neutral terminal N. Bimetal 23 will therefore be heated by auxiliary heat from the pilot circuit at all times when the contacts of switch 28 are closed.

The arm 33 of switch 28 is a bimetal member in strip form and this member is heated by an electric resistance heater in the form of a surrounding coil 35 when contacts 30 and 32 are closed. The initial closure of these contacts is established through an operating knob 36 which operates in familiar fashion through a face cam 37 secured to its shaft 38, to force arm 34 with its contact 32 into resiliently overclosed relationship to associated contact 30. It will be seen that, once this overclosure is established, heating current for bimetal strips 23 and 33 will flow through the pilot circuit until arm 33 is heated to a point causing its free end to flex with contact 30 until contacts 30 and 32 are again separated to open this pilot circuit. Upon interruption of the pilot circuit in this manner, arm 33 will again cool and flex to switch-closing position and contact 30 will thereafter be moved cyclically between switch-opening and switch-closing positions to apply heat through coil 26 to bimetal 23 at an average rate determined by the degree of actuation of control knob 36. Since this knob 36 and cam 37 are also employed to close the master switch (not shown) in the load circuit through heater 11, actuation of knob 36 serves both to establish the cooking operation and to determine the temperature level to be maintained.

The operation of this form of the invention should be evident from the foregoing discussion. To start the cooking operation control knob 36 is rotated from its inactive position to a position in which the load circuit between terminals $L^1$ and $L^2$ is closed and in which switch 28 is overclosed to an extent which determines the average rate of application of heat to bimetal strip 23, and hence the temperature of the pan in contact with disc 14 required to supplement this heat to open the load circuit through contacts 16 and 17 to interrupt the energization of the surface heater unit 11. Contact 30 will thereafter move cyclically as discussed above, and when the heat imparted to disc 14 from the pan rises by reason of energization of the surface heater unit 11 to the point established by the setting of knob 36, switch contacts 16, 17 will be opened to interrupt the load circuit, which will thereafter be energized only intermittently as the vessel temperature falls below the level to be established. By operating the control circuit jointly in response to the vessel heat and an auxiliary heat source operating at an established level by controlled intermittent energization, accurate control is obtained while minimizing the undesired phenomena of undershooting and overshooting. The switch 15 may be compensated for ambient temperature variation by employing a mounting arm 39 for the upper contact 16 in the form of a bimetal strip adapted to flex downwardly upon heating.

In FIGURES 3 and 4 of the drawing, I have illustrated application of the invention in control of the heating unit 51 of an oven 50. In this use, the features of the invention are the same in all essential particulars as in the form of FIGURES 1 and 2, the pilot control unit 52 with its control knob 53 being located remotely from the oven, while the control unit 54 is mounted within the oven, and responsive jointly to oven temperature and heat developed by the pilot circuit. This pilot circuit extends from terminal $L^2$ through pilot switch contacts 55 and 56, pilot bimetal heating coil 57 and control switch bimetal heating coil 58 to the neutral terminal N. From consideration of the discussion above of the use of the invention in controlling surface unit heaters, it will be evident that actuation of the knob 53 establishes the load circuit from terminal $L^2$, through the oven heating load 51, the indicating instrument 59, and switch 62 including contacts 63 and 64 to terminal $L^1$. At the same time, contact 55 of switch 65 is overclosed against its associated contact 56, with the result that the contacts of switch 65 are cyclically opened and closed to deliver to heater 58 for bimetal arm 66 of switch 62, a heating current at an average rate depending upon the setting of knob 53. The energization of the oven heating unit or units 51 will, therefore, be responsive to the actual temperature attained within the oven, and will be adjustable in response to the control knob.

FIGURES 5 and 6 illustrate control of a surface heater unit 10 by pilot and control units operating in accordance with the basic features of FIGURES 1 and 2, but embodies still further improvements. In this form of the invention, instead of utilizing the control switch 15 directly to regulate the energization of the surface heater unit 11, it is used to operate a thermal relay 70 including an electric resistance heater 71 in heat exchange relation with a bimetal arm 72 which carries a switch contact 73 co-acting with a second contact 74 to establish or break the load circuit through heater 11. The bimetal arm 33 operates to control the pilot circuit through contacts 30 and 32 in response to heat derived through coil 35 as in FIGURE 2, but the opening of switch 28′ through these contacts is somewhat modified by use of an opposed switch contact-carrying arm in the form of a bimetal strip 34′, and by associating this strip with a source of heat in such manner as to adjust the apparatus to varying cooking loads and other variable conditions.

The electric resistance heater 71 is energized at all times when heating current flows through surface heater 11, and bimetal arm 34′ carrying contact 32 is also heated at all such times. This may be accomplished by locating heater 71 in heat exchange relation to arm 34′ as well as arm 72, as illustrated, or by providing a separate parallel resistance heater for heating of arm 34′.

When control knob 36 is turned to the desired operating temperature, this closes the main load switch controlling flow of current between terminals $L^2$ and $L^1$ and through heater 11, contacts 74 and 73 and bimetal arm 72. At the same time, it establishes the control circuit from the neutral terminal N through contacts 17 and 16 of switch 15, heater 71 and bimetal arm 72 to terminal $L^1$. The resulting heating of bimetal 72 causes this arm to flex into position closing contact 73 against contact 74, thereby completing the load circuit outlined above, which circuit will remain closed until opened through contacts 16 and 17.

Closure of contacts 32 and 30 of switch 28′ by actuation of knob 36 also closes a pilot circuit as in the form of FIGURE 2. This circuit runs from terminal $L^1$ through contacts 32 and 30 and resistance heaters 35 and 26 to neutral terminal N.

From the foregoing discussion, it will be evident that the cyclic movement of contact 30 in opening and closing switch 28′ to provide an average rate of heating of bimetal strip 23 by resistance heater 26 provides supplemental heating of bimetal strip 23 in the same manner as in the form of the invention illustrated in FIGURE 2, and that the load circuit through contacts 73 and 74 will be broken to interrupt energization of surface heater 11 when switch 15 is opened in joint response to this heating of bimetal 23 and the vessel temperature. This form of the invention involves an improvement and refinement over that of FIGURE 2 in regard to operation of arm 34′ in response to heat derived from resistance heater 71, however, since the arm 34′ is designed to flex in a direction toward arm 33 upon the heating of arm 34′. As a consequence of this fact, and of the fact that arm 34′ derives heat from heater 71 at all times when the load circuit is energized, the bimetal strip 33 will be required to attain a higher temperature to effect opening of switch 28′ through its contacts 30 and 32 as heating of bimetal strip 34′ progresses in response to closure of the control circuit. This combination of features provides a highly desirable result, in that it produces an adjustment in the operation of switch 28′ which is directly related to the heating load. In short, the inclusion of this feature provides an energization of heater 11 which is prolonged in heating a large load, thereby providing a desirable degree of preliminary heating with all types of loads, while at the same time minimizing the dangers of overshooting or undershooting, which are particularly great in the case of the small loads.

While the invention has been described above specifically in relation to two forms of the invention in their application to two types of cooking range unit, persons skilled in the art will be aware that it may be modified and refined in various ways within its generic scope. I therefore wish it to be understood that the invention is not to be limited in interpretation except by the scope of the following claims.

I claim:

1. In control apparatus for the energization of a cooking range, the combination comprising a support for a cooking vessel, an energy-supplying heating unit for a vessel mounted upon said support, a switch including a thermomotive member mounted beneath the supported position of a cooking vessel in heat exchange relation therewith for sensing the temperature to which the vessel is heated by said unit, an electric resistance heater mounted in heat exchange relationship with said thermomotive member, and a pair of switch contacts relatively movable in response to the temperature of said thermomotive member to open position upon heating of said thermomotive member to a predetermined temperature and to closed position upon cooling thereof, an electric circuit controlling the energization of said unit and controlled by the operation of said switch, a second switch embodying a further pair of switch contacts, a second thermomotive member mounted in actuating relationship to one of the contacts of said further pair of switch contacts, a second electric resistance heater mounted in heat exchange relationship to said second thermomotive member, a pilot circuit including both of said electric resistance heaters and controlled for intermittent energization in response to the cyclic movements of said second thermomotive member, a third switch embodying a third pair of switch contacts in a load circuit including said energy-supplying heating unit, and means for closing the contacts of said third switch and thereby energizing said heating unit at times when the contacts of said first-mentioned switch are closed.

2. In control apparatus for the energization of a cooking range, the combination comprising an energy-supplying heating unit for supplying cooking heat, a switch including a thermomotive member mounted in heat exchange relationship to temperature produced by the range for sensing thereof, an electric resistance heater mounted in heat exchange relationship with said thermomotive member, and a pair of switch contacts relatively movable in response to the temperature of said thermomotive member to open position upon heating of said thermomotive member to a predetermined temperature and to closed position upon cooling thereof, an electric circuit controlling the energization of said unit and controlled by the operation of said switch, a second switch embodying a further pair of switch contacts, a second thermomotive member mounted in actuating relationship to one of the contacts of said further pair of switch contacts, a second electric resistance heater mounted in heat exchange relationship to said second thermomotive member, a pilot circuit including both of said electric resistance heaters and controlled for intermittent energization in response to the cyclic movements of said second thermomotive member, and a third switch embodying a third pair of switch contacts in a load circuit including said energy-supplying heating unit, and means for closing the contacts of said third switch and thereby energizing said heating unit at times when the contacts of said first-mentioned switch are closed.

3. In control apparatus for the energization of a cooking range, the combination comprising a support for a cooking vessel, an energy-supplying heating unit for a vessel mounted upon said support, a switch including a thermomotive member mounted beneath the supported position of a cooking vessel in heat exchange relation therewith for sensing the temperature to which the vessel is heated by said unit, an electric resistance heater mounted in heat exchange relationship with said thermomotive member, and a pair of switch contacts relatively movable in response to the temperature of said thermomotive member to open position upon heating of said thermomotive member to a predetermined temperature and to closed position upon cooling thereof, an electric circuit controlling the energization of said unit and controlled by the operation of said switch, a second switch embodying a further pair of switch contacts, a second thermomotive member mounted in actuating relationship to one of the contacts of said further pair of switch contacts, a second electric resistance heater mounted in heat exchange relationship to said second thermomotive member, a pilot circuit including both of said electric resistance heaters and controlled for intermittent energization in response to the cyclic movements of said second thermomotive member, and a third switch embodying a third pair of switch contacts in a load circuit including said energy-supplying heating unit, a third thermomotive member interconnected with a contact member of said third pair of contact members to effect movement thereof and a third electric resistance heater in said control circuit, said third electric resistance heater being mounted in heat exchange relation with said third thermomotive member, whereby said contacts of said third switch are closed by energization of said control circuit resulting from closure of said first-mentioned switch.

4. In control apparatus for the energization of a cooking range, the combination comprising an energy-supplying heating unit for supplying cooking heat, a switch including a thermomotive member mounted in heat exchange relationship to temperature produced by the range for sensing thereof, an electric resistance heater mounted in heat exchange relationship with said thermomotive member, and a pair of switch contacts relatively movable in response to the temperature of said thermomotive member to open position upon heating of said thermomotive member to a predetermined temperature and to closed position upon cooling thereof, an electric circuit controlling the energization of said unit and controlled by the operation of said switch, a second switch embodying a further pair of switch contacts, a second thermomotive member mounted in actuating relationship to one of the contacts of said further pair of switch contacts, a second electric resistance heater mounted in heat exchange relationship to said second thermomotive member, a pilot circuit including both of said electric resistance heaters and controlled for intermittent energization in response to the cyclic movements of said second thermomotive member, and a third switch embodying a third pair of switch contacts in a load circuit including said energy-supplying heating unit, a third thermomotive member interconnected with a contact member of said third pair of contact members to effect movement thereof and a third electric resistance heater in said control circuit, said third electric resistance heater being mounted in heat exchange relation with said third thermomotive member, whereby said contacts of said third switch are closed by energization of said control circuit resulting from closure of said first-mentioned switch.

5. In control apparatus for the energization of a cooking range, the combination comprising a support for a cooking vessel, an energy-supplying heating unit for a vessel mounted upon said support, a switch including a thermomotive member mounted beneath the supported position of a cooking vessel in heat exchange relation therewith for sensing the temperature to which the vessel is heated by said unit, an electric resistance heater mounted in heat exchange relationship with said thermomotive member, and a pair of switch contacts relatively movable in response to the temperature of said thermomotive member to open position upon heating of said thermomotive member to a predetermined temperature and to closed position upon cooling thereof, an electric circuit controlling the energization of said unit and controlled by the operation of said switch, a second switch embodying a further pair of switch contacts, a second thermomotive member mounted in actuating relationship to one of the contacts of said further pair of switch contacts, a second electric resistance heater mounted in heat exchange relationship to said second thermomotive member, a pilot circuit including both of said electric resistance heaters and controlled for intermittent energization in response to the cyclic movements of said second thermomotive member, and a third switch embodying a third pair of switch contacts in a load circuit including said energy-supplying heating unit, a third thermomotive member interconnected with a contact member of said third pair of contact members to effect movement thereof and a third electric resistance heater in said control circuit, said third electric resistance heater being mounted in heat exchange relation with said third thermomotive member, whereby said contacts of said third switch are closed by energization of said control circuit resulting from closure of said first-mentioned switch, said second switch including a fourth thermomotive member mounted in actuating relationship to the other of its switch contacts, said second thermomotive member being constructed to actuate its associated switch contact in switch-opening direction upon heating and said fourth thermomotive member being constructed to actuate its associated switch contact in switch-closing direction upon heating, said third electric resistance heater being mounted in heat exchange relationship to fourth thermomotive member as well as said third thermomotive member.

6. In control apparatus for the energization of a cooking range, the combination comprising an energy-supplying heating unit for supplying cooking heat, a switch including a thermomotive member mounted in heat exchange relationship to temperature produced by the range for sensing thereof, an electric resistance heater mounted in heat exchange relationship with said thermomotive member, and a pair of switch contacts relatively movable in response to the temperature of said thermomotive member to open position upon heating of said thermomotive member to a predetermined temperature and to closed position upon cooling thereof, an electric circuit controlling the energization of said unit and controlled by the operation of said switch, a second switch embodying a further pair of switch contacts, a second thermomotive member mounted in actuating relationship to one of the contacts of said further pair of switch contacts, a second electric resistance heater mounted in heat exchange relationship to said second thermomotive member, a pilot circuit including both of said electric resistance heaters and controlled for intermittent energization in response to the cyclic movements of said second thermomotive member, and a third switch embodying a third pair of switch contacts in a load circuit including said energy-supplying heating unit, a third thermomotive member interconnected with a contact member of said third pair of contact members to effect movement thereof and a third electric resistance heater in said control circuit, said third electric resistance heater being mounted in heat exchange relation with said third thermomotive member, whereby said contacts of said third switch are closed by energization of said control circuit resulting from closure of said first-mentioned switch, said second switch including a fourth thermomotive member mounted in actuating relationship to the other of its switch contacts, said second thermomotive member being constructed to actuate its associated switch contact in switch-opening direction upon heating and said fourth thermomotive member being constructed to actuate its associated switch contact in switch-closing direction upon heating, said third electric resistance heater being mounted in heat exchange relationship to said fourth thermomotive member as well as said third thermomotive member.

7. In control apparatus for the energization of a cooking range, the combination comprising an energy-supplying heating unit for supplying cooking heat, a switch including a thermomotive member mounted in heat exchange relationship to temperature produced by the range for sensing thereof, an electric resistance heater mounted in heat exchange relationship with said thermomotive member, and a pair of switch contacts relatively movable in response to the temperature of said thermomotive member to open position upon heating of said thermomotive member to a predetermined temperature and to closed position upon cooling thereof, an electric circuit controlling the energization of said unit and controlled by the operation of said switch, a second switch embodying a further pair of switch contacts, a second thermomotive member mounted in actuating relationship to one of the contacts of said further pair of switch contacts, a second electric resistance heater mounted in heat exchange relationship to said second thermomotive member, a pilot circuit including both of said electric resistance heaters and controlled for intermittent energization in response to the cyclic movements of said second thermomotive member, a third switch embodying a third pair of switch contacts in a load circuit including said energy-supplying heating unit, means for closing the contacts of said third switch and thereby energizing said unit in response to closure of said first-mentioned switch, and means operative in response to closure of said first-mentioned switch for retarding the opening of said second-mentioned switch contacts.

8. In control apparatus for the energization of a cooking range, the combination comprising an energy-supplying heating unit for supplying cooking heat, a switch including a thermomotive member mounted in heat exchange relationship to temperature produced by the range for sensing thereof, an electric resistance heater mounted in heat exchange relationship with said thermomotive member, and a pair of switch contacts relatively movable in response to the temperature of said thermomotive member to open position upon heating of said thermomotive member to a predetermined temperature and to closed position upon cooling thereof, an electric circuit controlling the energization of said unit and controlled by the operation of said switch, a second switch embodying a further pair of switch contacts, a second thermomotive member mounted in actuating relationship to one of the contacts of said further pair of switch contacts, a second electric resistance heater mounted in heat exchange relationship to said second thermomotive member, a pilot circuit including both of said electric resistance heaters and controlled for intermittent energization in response to the cyclic movements of said second thermomotive member, and means responsive to closure of said first-mentioned switch contacts for retarding the opening of said second-mentioned switch contacts.

9. In a control apparatus for the energization of a cooking device, the combination comprising an energy supplying heating unit for the cooking operation, a thermomotive member adapted to move a pair of associated contacts between open and closed positions in response to temperature changes resulting from the operation of said heating unit, said contacts being adapted to open and to close a load circuit including said heating unit, thermal controlling means for cyclically controlling said first contacts, means including a second thermomotive member in association with a second pair of contacts located remotely from the location of said heating unit having thermal controlling means associated with said thermostatic member for cyclically controlling the energization of said unit and having a separate adjusting means associated with one of the contacts for adjusting and selecting the temperature of said unit, and circuit means including said second pair of contacts and the controlling means for both the first and second pair of contacts adapted to cause said first thermomotive member to be intermittently heated in response to the cyclic movements of said second thermomotive member.

10. The control apparatus of claim 9 in which the adjusting means associated with the remotely located thermomotive member is the sole adjusting means for selecting the operating temperature of the unit.

11. The control apparatus of claim 10 in which the controlling means are electric resistance heaters located in heat exchange relationship with each of said thermomotive members and said circuit means is a low wattage pilot circuit including said resistance heaters together with the remote pair of contacts that determine the operating temperature.

12. In a control apparatus for the energization of an electric heating unit, switch means located remotely from the location of said heating unit comprising a pair of thermally actuated members being movable in the same general direction when heated, contacts secured to said bimetallic members respectively to be movable into and out of engagement with each other, electrical circuit means electrically connected to each of said contacts for controlling the energization of said heating unit, electrical resistance heater means supported in heat-exchange relationship with respect to one of said thermally actuated members to open said contacts and electrical resistance heater means in heat exchange relationship with the other thermally actuated member to retard the opening of said contacts.

13. In a control apparatus for the energization of a cooking device, the combination comprising an energy-supplying heating unit for the cooking operation, a thermomotive member responsive to heat derived from said heating unit, a pair of contacts movable by said thermomotive member between closed and open position, a resistance heater in heat-transfer relationship with said thermomotive member, means for connecting said heating unit and said resistance heater to an electric power source, means for intermittently energizing said resistance heater at a constant average rate, circuit means controlled by said contacts for supplying current to said heating unit in accordance with heat derived from said heating unit, and manual adjustment means for changing the constant average rate at which said resistance heater is energized to adjust and select the temperature of said unit.

References Cited in the file of this patent

UNITED STATES PATENTS

| | | |
|---|---|---|
| 1,700,661 | Appelberg | Jan. 29, 1929 |
| 1,718,748 | Marshall | June 25, 1929 |
| 2,122,650 | Keene | July 5, 1938 |
| 2,399,423 | Bletz | Apr. 30, 1946 |
| 2,427,945 | Clark et al. | Sept. 23, 1947 |
| 2,510,038 | Rudahl | May 30, 1950 |
| 2,684,430 | Bieling | July 20, 1954 |
| 2,727,129 | Davis | Dec. 13, 1955 |
| 2,727,973 | Collins | Dec. 20, 1955 |